United States Patent [19]

Schippert

[11] Patent Number: 4,976,751
[45] Date of Patent: Dec. 11, 1990

[54] METHOD FOR PURIFICATION OF EXHAUST AIR

[75] Inventor: Egbert Schippert, Dierdorf, Fed. Rep. of Germany

[73] Assignee: Keramchemie GmbH, Siershahn, Fed. Rep. of Germany

[21] Appl. No.: 409,281

[22] Filed: Sep. 19, 1989

Related U.S. Application Data

[63] Continuation-in-part of Ser. No. 177,635, Apr. 5, 1988, abandoned.

[51] Int. Cl.$^5$ .............................................. B01D 47/00
[52] U.S. Cl. ........................................... 55/84; 55/85; 55/89; 210/615
[58] Field of Search ................. 55/84, 85, 89, 228, 55/233, 242; 210/150, 615

[56] References Cited

U.S. PATENT DOCUMENTS

| | | | |
|---|---|---|---|
| 4,102,983 | 7/1978 | Yamase et al. | 55/84 |
| 4,137,171 | 1/1979 | Yokata | 210/150 |
| 4,265,944 | 5/1981 | Garner | 55/84 |
| 4,339,248 | 7/1982 | Garner | 55/84 |
| 4,378,235 | 3/1983 | Cosper et al. | 55/85 |
| 4,397,662 | 8/1983 | Bloomer | 55/233 |
| 4,444,573 | 4/1984 | Cosper et al. | 55/85 |
| 4,472,181 | 9/1984 | Herrlander | 55/228 |
| 4,563,199 | 1/1986 | Lindenberger et al. | 55/85 |
| 4,680,111 | 7/1987 | Ueda | 210/150 |
| 4,723,968 | 2/1988 | Schippert et al. | 55/222 |

*Primary Examiner*—Jay H. Woo
*Assistant Examiner*—C. Scott Bushey
*Attorney, Agent, or Firm*—Toren, McGeady & Associates

[57] ABSTRACT

In a known method for the purification of exhaust air containing impurities which are biologically degradable and difficultly soluble in water, by means of activated sludge washing liquid in an absorption tower, pulverized activated carbon is added to the activated sludge washing liquid. The impurities are initially absorbed by the activated carbon and are subsequently degraded by the microorganisms of the activated sludge. Since the impurities are not transferred directly to the activated carbon, but through the washing liquid, material exchange apparatus having high turbulence are required which have a high energy consumption. By adding a high-boiling, organic solvent, for example, dialkyl phthalate, material exchange apparatus having a low energy consumption can be used, the absorption efficiency is increased and peak loads can be compensated in a buffer-like manner.

6 Claims, 1 Drawing Sheet

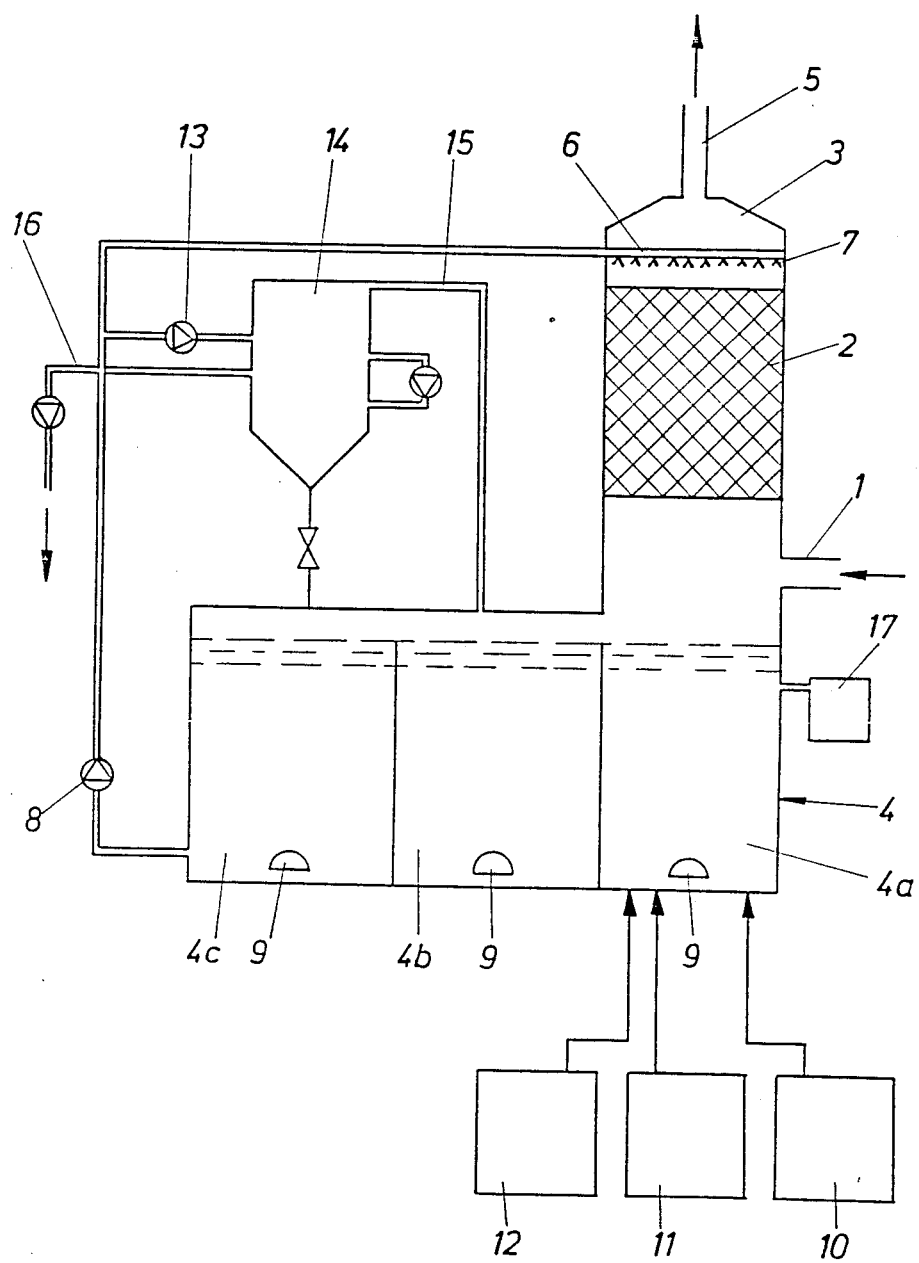

METHOD FOR PURIFICATION OF EXHAUST AIR

This is a continuation-in-part of application Ser. No. 07/177,635, filed Apr. 5, 1988 now abandoned.

BACKGROUND OF THE INVENTION

1. Field of the Invention

The invention relates to a method for the purification of exhaust air containing impurities which are biologically degradable and are particularly difficultly soluble in water. The method includes conducting the exhaust air through an absorption tower in which the impurities are absorbed by a washing liquid containing activated sludge and are subsequently biologically degraded in an activated sludge tank by the microorganisms of the activated sludge.

2. Description of the Prior Art

From the magazine "Staub-Reinhaltung der Luft" [Dust Purification of Air] (1979), pages 308-314, a method for the purification of exhaust air containing biologically degradable impurities is known in which the exhaust air containing the impurities is conducted through an absorption tower filled with packing bodies. An activated sludge washing liquid is conducted through the absorption tower in a counterflow to the exhaust air. The activated sludge washing liquid is pumped to circulate from an activated sludge tank. When the activated sludge washing liquid contacts the exhaust air, the impurities contained in the exhaust air are absorbed by the activated sludge washing liquid. The absorption capacity of the activated sludge washing liquid depends on the solubility of the impurities in the washing liquids and the regeneration thereof. The absorbed impurities are biologically degraded in the activated sludge tank by species-specific microorganisms. The regenerated activated sludge washing liquid is then again capable of absorbing impurities from the exhaust air.

The efficiency of an absorption tower or of a biological washer relative to the purification performance for the individual impurities is thus dependent upon the absorption capacity of the activated sludge washing liquid and the latter, in turn, is dependent upon the rate of degradation of the individual impurities in the activated sludge by the appropriate microorganisms. If the supply of impurities to the liquid phase or the activated sludge washing liquid is greater than the corresponding rate of degradation of the respective impurities in the activated sludge tank, inevitably an enrichment of impurities in the activated sludge washing liquid occurs. With increasing enrichment of impurities, the partial vapor pressure of the impurities above the liquid phase approaches that of the gaseous phase. Thus, the obtainable absorption efficiency of the impurities is limited. Variations of the concentration of the impurities may result in that already absorbed impurities are again set free. This is particularly the case when the exhaust air flow contains impurities which are difficultly soluble in water. This known method for the purification of exhaust air containing biologically degradable impurities does not have a buffer capacity for handling peak loads. The absorption capacity of the activated sludge washing liquid is very low for materials which are difficultly soluble in water. For example, in the case of a concentration of 200 mg/m³ toluene in the washer inlet, the maximum absorption capacity is 1 mg/l in the washing water so that the minimum amount of washing water for obtaining a significant efficiency is 0.2 to 0.4 m³ washing water per m³ exhaust air. This cannot be realized for economical reasons.

German Offenlegungsschrift No. 32 27 375 discloses a method for the purification of exhaust air containing biologically degradable impurities in which pulverized activated carbon is added to the activated sludge washing liquid for increasing the absorption efficiency and for providing a buffer capacity for handling peak loads. The impurities which are difficultly soluble in water are initially adsorbed by the activated carbon and are subsequently degraded by the microorganisms of the activated sludge, i.e., the activated carbon is biologically regenerated. This method has the practical disadvantage that the addition of large amounts of activated carbon causes the solids content of the activated sludge washing liquid to increase and, thus, the danger of clogging of the washing system increases. Particularly when very high-boiling, i.e., very well absorbable impurities are present, these impurities are practically irreversibly bound to the activated carbon over a period of time and then block the activated carbons for the actual low-boiling impurities to be removed from the exhaust air. Moreover, in this method, the material transfer of the impurities to be absorbed to the activated carbon does not take place directly, but rather from the exhaust air through the activated sludge washing liquid to the activated carbon. The last step in the use of conventional absorption towers with packing bodies determines the velocity of the process and is very slow, so that, for a successful use of this method, material exchange apparatus having very high turbulence of the washing water must be used. However, these are only washers which have a very high energy consumption, for example, Venturi washers, washers with perforated bottoms, bubbling tray washers, gas bubble washers.

It is the object of the invention to provide a method for the purification of exhaust air containing impurities which are biologically degradable and particularly difficultly soluble in water, wherein, when utilizing conventional washers or absorption towers having a low energy consumption, the danger of clogging of the washing system is essentially excluded, the obtainable absorption efficiency is increased and a buffer capacity for handling peak loads exists.

SUMMARY OF THE INVENTION

In accordance with the present invention, the above object is met by a method of purifying exhaust air containing impurities which are biologically degradable and are particularly difficulty soluble in water, the method including conducting the exhaust air through an absorption tower, absorbing the impurities by a washing liquid composed of water containing 1 to 15 g per liter activated sludge and subsequently biologically degrading the impurities in an activated sludge tank by the microorganisms of the activated sludge, and adding a high-boiling organic solvent in an amount of 5 to 35% to the washing liquid containing the activated sludge, wherein the organic solvent is selected from the group consisting of dialkyl phthalate, methyl silicone oil, trimellitic acid ester and modified silicone oils in which 20% to 80% of the methyl group are substituted by hexyl groups or phenyl propyl groups, and wherein the properties of the organic solvent are a very low pressure of less than 50 mg per cubic meter at normal temperature; a high dissolving power for organic substances, such that the organic solvent is mixable in any ratio with the impurities to be absorbed; together with water being in the form of a coarse dispersion or a fine emulsion which has no toxic or other harmful effects on the microorganisms; less than 10 mg per liter are soluble in water; and a low biological degradability of less than 50 mg per liter an hour. The washing liquid may contain 3 g per liter activated sludge.

The solvent must have a verY low vapor pressure at normal temperature so that legally prescribed limits with respect to emissions are not exceeded already by the solvent. The solvent must have a high dissolving power for organic impurities. Together with water in the form of a coarse dispersion or a fine emulsion, the solvent may not have any toxic or otherwise harmful effects on microorganisms. The solvent must have a low solubility in water and must itself have a low biological degradability. Dialkyl phthalate, such as dioctyl phthalate or dinonyl phthalate have been found particularly suitable.

Depending upon the solubility in water of the impurities to be absorbed and biologically degraded and depending upon the concentration of impurities, the ratio of organic phase and aqueous phase of the absorption agent can be freely selected, so that an optimum efficiency is obtained. In the extreme case, when exclusively very poorly water soluble impurities are present, it is possible to carry out the actual absorption procedure only with the high-boiling, organic solvent. In this procedure, the organic washing agent containing the impurities is biologically regenerated in an external, aerated container by thoroughly mixing it with water which contains the adapted activated sludge. The highest-boiling solvent is separated from the mixture of water and activated sludge in a settling or rotation unit and the regenerated high-boiling solvent is again fed to the absorption tower.

Since the rate of the biological degradation is in the first approximation proportional to the stationary concentration in the aqueous phase, it may be useful, in order to minimize the total size of the activated sludge tank, to provide two or more smaller tanks which are connected one behind the other. It is also possible to provide a two-stage or multiple-stage absorption system in which absorption stage has a separate activated sludge tank.

BRIEF DESCRIPTION OF THE DRAWING

The FIGURE of the drawing schematically shows a system for carrying out the method according to the present invention.

DETAILED DESCRIPTION OF THE DRAWING

A method for the biological purification of the exhaust air of a lacquering or varnishing plant is described. In such a plant, approximately 10 000 m³ air are produced. In addition to solvents which dissolve well in water, such as alcohols, glycol ethers and glycol esters, the exhaust air also contains poorly soluble solvents, such as, aromatic substances or aliphatic hydrocarbons, for example, 200 mg/m³ ethanol and 200 mg/³ xylene. The exhaust air is fed through a line 1 to a purification arrangement. In this embodiment, the purification arrangement includes a single-stage absorption tower 3 which is provided with a layer 2 of filler bodies. At the lower end, absorption tower 3 continues into an activated sludge tank 4 which simultaneously forms the socalled sump for the absorption tower 3. The line 1 leads laterally above the activated sludge tank 4 into the absorption tower 3. A discharge opening 5 for the purified exhaust air is provided at the upper end of the absorption tower 3. A pipeline 6 is provided above the layer 2 of filler bodies. Pipeline 6 is provided with a plurality of spray nozzles 7 which are uniformly distributed over the cross-section of the absorption tower 3. The liquid from the activated sludge tank 4 is sprayed or distributed through the spray nozzles 7 onto the layer 2 by means of a pump 8.

In the illustrated embodiment, the activated sludge tank 4 is constructed in three stages and has three tanks 4a, 4b, 4c which are arranged cascade-like one behind the other. While tank 4a has a volume of 20 m³, tanks 4b and 4c each have a volume of 30 m³. All three tanks 4a, 4b, 4c are provided, for example, with an immersion aerator 9 which not only aerates the mixture but also simultaneously agitates the mixture.

In this embodiment, the washing liquid contains 70% water with 3 g/l microorganisms adapted to ethanol and xylene and 30% dinonyl phthalate. A pH-value of 5 to 9 is maintained in the washing liquid, for example, by adding soda lye from a container 10. In addition, containers 11,12 with nitrogen and phosphorus are provided for maintaining the biocenosis in the washing liquid.

The exhaust air containing impurities is fed into the absorption tower 3 from below. The washing liquid is sprayed through nozzle 7 onto the layer 2 of filling bodies in a counterflow to the exhaust air. The material exchange from the exhaust air to the washing liquid takes place in the layer 2 of filling bodies. The layer 2 of filling bodies with a large free passage area causes a significant turbulence of the exhaust air and the washing liquid and, thus, a high degree of surface regeneration which is decisive for a good material transfer. After the washing liquid containing the impurities have left the layer 2, the liquid flows back into the tank 4a of activated sludge tank 4. The biological regeneration of the washing liquid containing the impurities and the degradation of the absorbed impurities takes place in the activated sludge tank 4. Predominantly the ethanol which is for the most part absorbed in the aqueous phase is degraded. In tanks 4b and 4c, on the other hand, the dinonyl phthalate is regenerated by degradation of xylene.

In order to prevent an accumulation of salt and a possible enrichment of the washing liquid with biological inhibiting substances, approximately 500 l/h of the washing liquid are removed from the washing liquid cycle by means of a pump 13 and are fed to a flotation tank 14. In this flotation tank 14, the high-boiling solvent is separated with the activated sludge from the washing liquid by flotation and is returned through a line 15 into the tank 4b of the activated sludge tank 4. The purified water is fed from the flotation tank 14 through a line 16 to the sewer system.

The purified exhaust air discharged through line 5 has a content of 10 mg/m³ ethanol and 30 mg/m³ xylene. The contents of dinonyl phthalate is smaller than 10 mg/m³. The dinonyl phthalate consumption due to the biological degradation in the activated sludge tank 4 is smaller than 10 mg/h. The consumption of dinonyl phthalate is filled up by means of a container 17. The presence of high-boiling, organic solvent has no negative influence on the degradation of the impurities.

I claim:

1. A method of purifying exhaust air containing impurities which are biologically degradable and are particularly difficultly soluble in water, comprising conducting the exhaust air through an absorption tower, absorbing the impurities by a washing liquid composed of water containing 1 to 15 g per liter activated sludge and subsequently biologically degrading the impurities in an activated sludge tank by the microorganisms of the activated sludge, and adding a high-boiling organic solvent in an amount of 5 to 35% to the washing liquid containing the activated sludge, wherein the organic solvent is selected from the group consisting of dialkyl phthalate, methyl silicone oil, trimellitic acid ester and modified silicone oils inn which 20% to 80% of the methyl group are substituted by hexyl groups or phenyl propyl groups, and wherein the organic solvent has the following properties:

a. a very low vapor pressure of less than 50 mg per cubic meter at normal temperature;
  b. a high dissolving power for organic substances, such that the organic solvent is mixable in any ratio with the impurities to be absorbed;
  c. together with water being in the form of a coarse dispersion or a fine emulsion which has no toxic or other harmful effects on the microorganisms;
  d. less than 10 mg per liter are soluble in water; and
  e. a low biological degradability of less than 50 mg per liter an hour.

2. Method according to claim 1, wherein dioctyl phthalate or dinonyl phthalate are added to the washing liquid.

3. Method according to claim 1, wherein a pH-value of 5-9 is maintained in the washing liquid.

4. Method according to claim 1, wherein the washing liquid is conducted cascade-like through the activated sludge tank having several stages.

5. Method according to claim 1, wherein the washing liquid contains 3 g per liter activated sludge.

6. Method according to claim 1, wherein 30% of organic solvents are added to the washing liquid.

* * * * *